Figure 5:
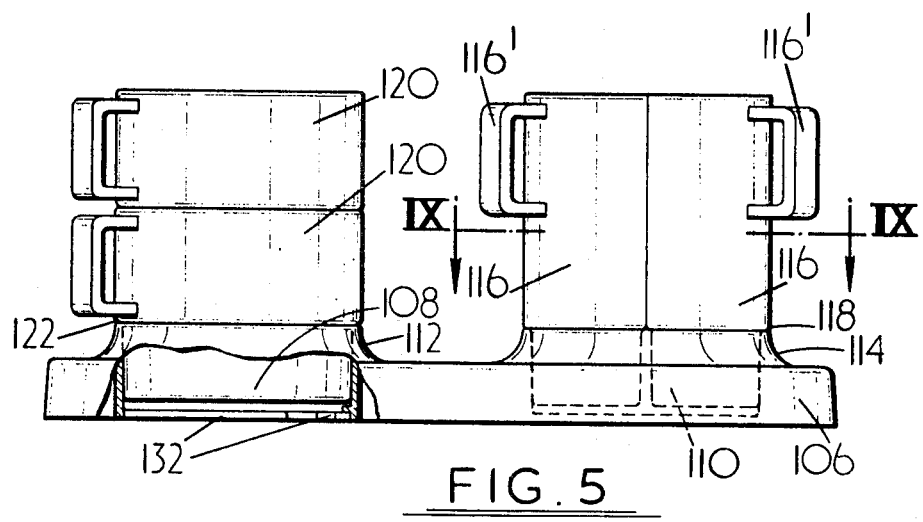

United States Patent

Grundy et al.

[11] 3,981,231
[45] Sept. 21, 1976

[54] BEVERAGE-MAKING APPARATUS

[75] Inventors: Frederick Simm Grundy, Leigh; John Byron King, Mossley, both of England

[73] Assignee: Pifco Limited, Manchester, England

[22] Filed: Oct. 3, 1975

[21] Appl. No.: 619,162

[52] U.S. Cl. .................................. 99/280; 99/299
[51] Int. Cl.² ............................................. A47J 31/047
[58] Field of Search ............... 99/280, 279, 281–282, 99/283–284, 285, 299, 300, 301–302, 305; 426/384, 386–387, 590, 594; 202/165, 166

[56] References Cited
UNITED STATES PATENTS

| | | | |
|---|---|---|---|
| 2,089,303 | 8/1937 | Sica | 99/279 X |
| 2,808,775 | 10/1957 | Schott | 99/281 UX |
| 3,182,584 | 5/1965 | Serio | 99/284 |
| 3,338,153 | 8/1967 | Holstein et al. | 99/282 X |

*Primary Examiner*—Peter Feldman
*Assistant Examiner*—Arthur O. Henderson
*Attorney, Agent, or Firm*—Sughrue, Rothwell, Mion, Zinn and Macpeak

[57] ABSTRACT

A beverage making apparatus comprising a fixed, hermetically sealable, thermostatically controlled, water-heating, electric kettle mounted above a removable infusion vessel in which the beverage is prepared using hot water which syphons from the kettle via a syphon tube into the vessel through an opening in the top thereof. The syphon tube, which is in a generally vertical plane, has an upper part which is coiled and extends through a base of the kettle to discharge the water into the opening in the vessel.

5 Claims, 9 Drawing Figures

U.S. Patent  Sept. 21, 1976  Sheet 2 of 3  3,981,231

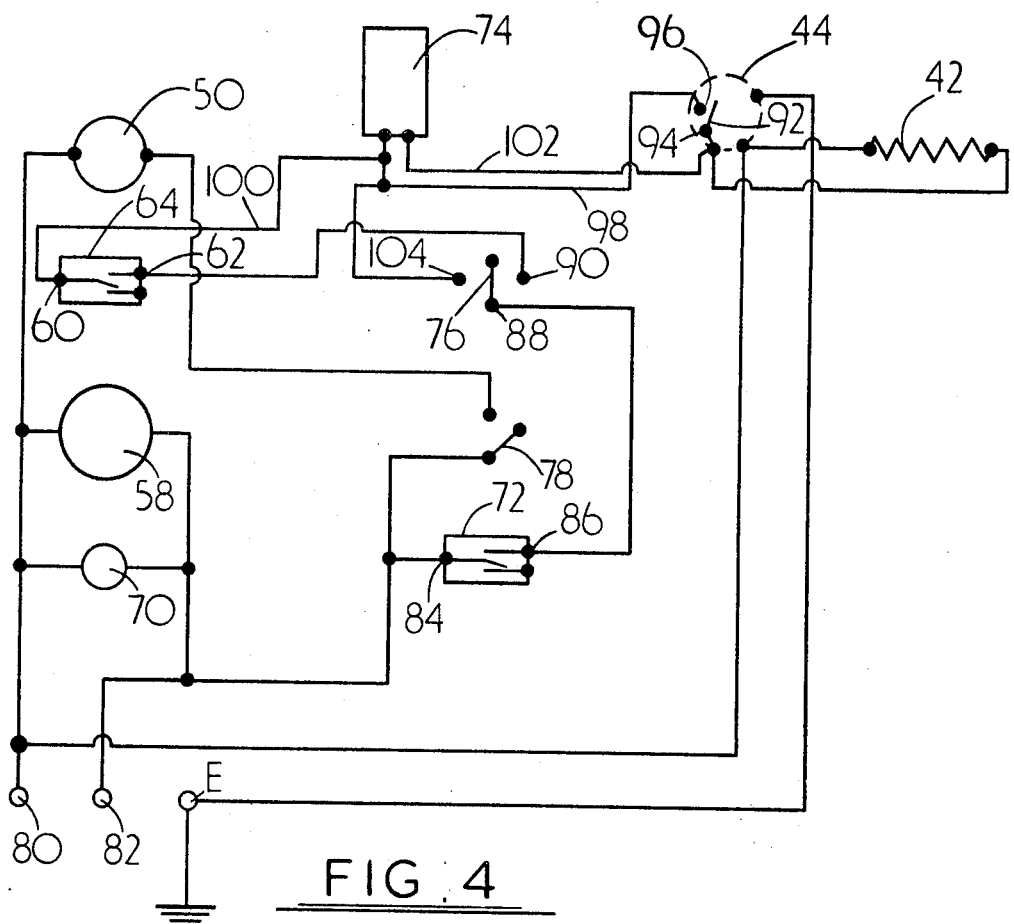
FIG. 4
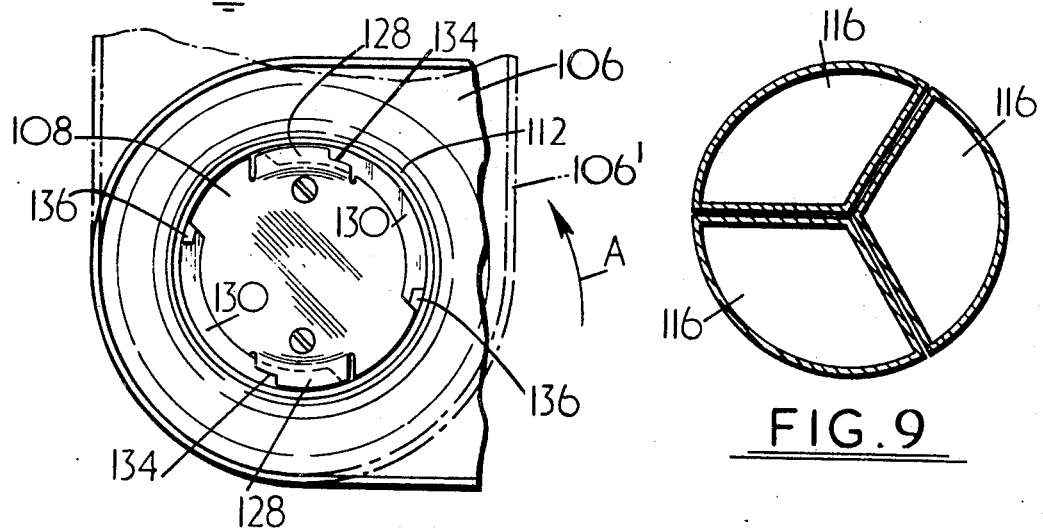
FIG. 8
FIG. 9

BEVERAGE-MAKING APPARATUS

This invention relates to improvements in beverage-making apparatus in particular but not solely tea-makers of the kind which make tea automatically at a predetermined time according to a variable setting on a clock or alternatively, can be operated manually irrespective of the clock.

According to the invention a beverage-making apparatus comprises a water-heating kettle with removable lid means which when fitted on said kettle results in the interior of the kettle being in substantial fluid-tight isolation from the surrounding atmosphere, said kettle being provided with an electrically powdered heating element connected to a control circuit for connection to a supply of electrical current, a syphon tube provided inside the kettle and having an open end disposed adjacent to the base of said kettle, said tube having a first tube portion extending upwardly from said end to a second tube portion comprising more than one coil of tube to prevent or impede pre-syphoning, and a third tube portion extending downwardly from the second tube portion to an open second end of the tube disposed below the base of the kettle for introducing hot water into a tea-pot or other infusion vessel, disposed below the kettle, and a thermally operated device responsive to the temperature of the water in the kettle to interrupt a conductive path supplying electrical energy to said heating element, when the temperature rises above a predetermined value.

Figure 1:
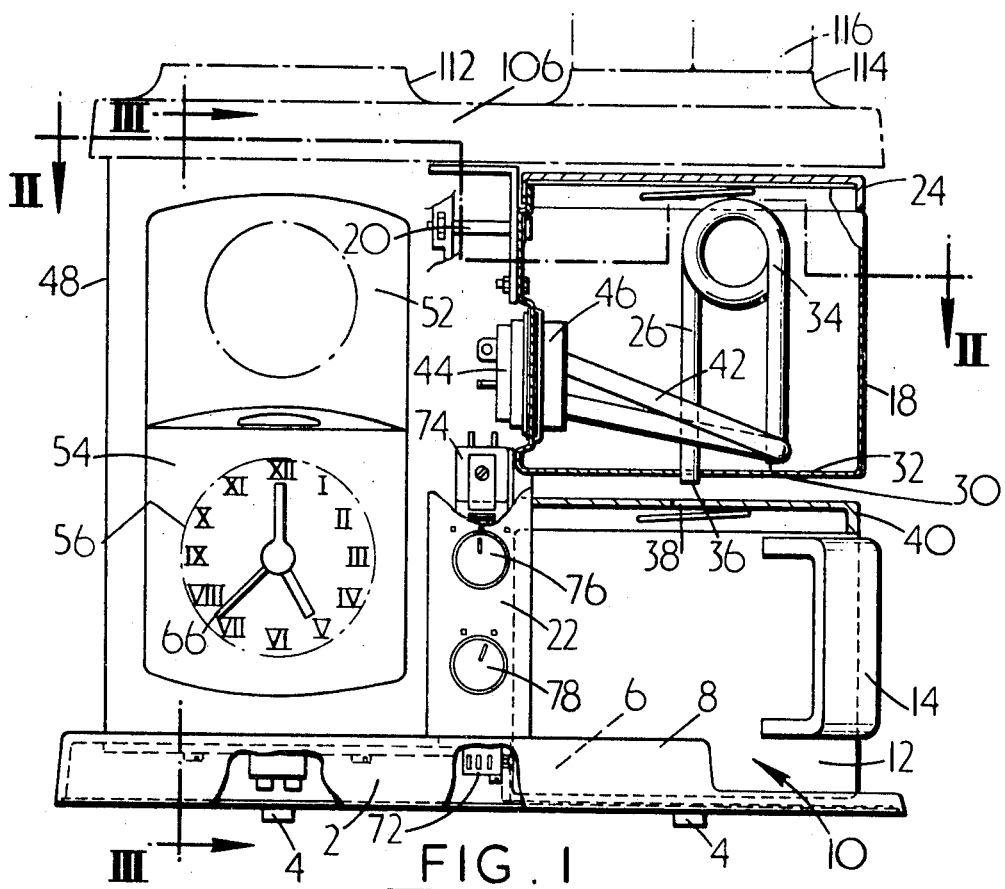
Figure 6:
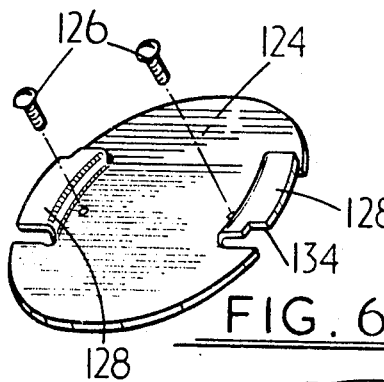
Figure 7:
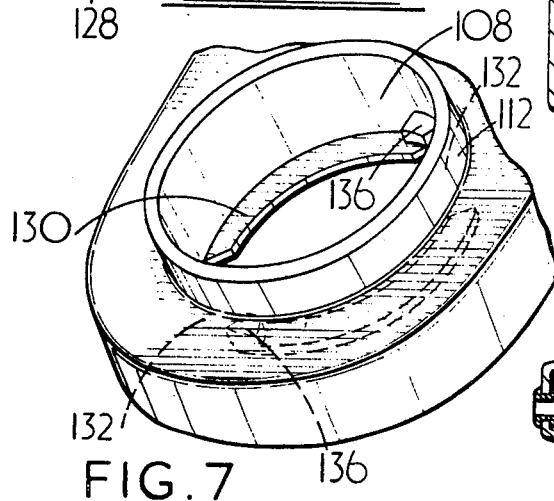
Figure 3:
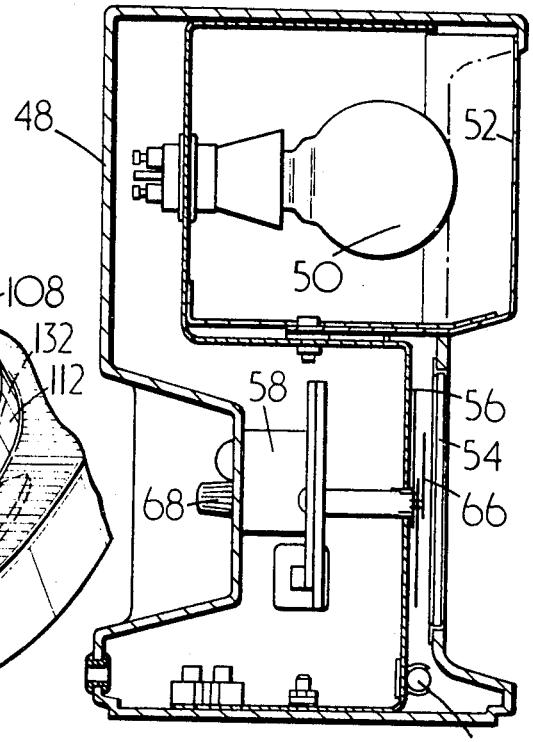
Figure 2:
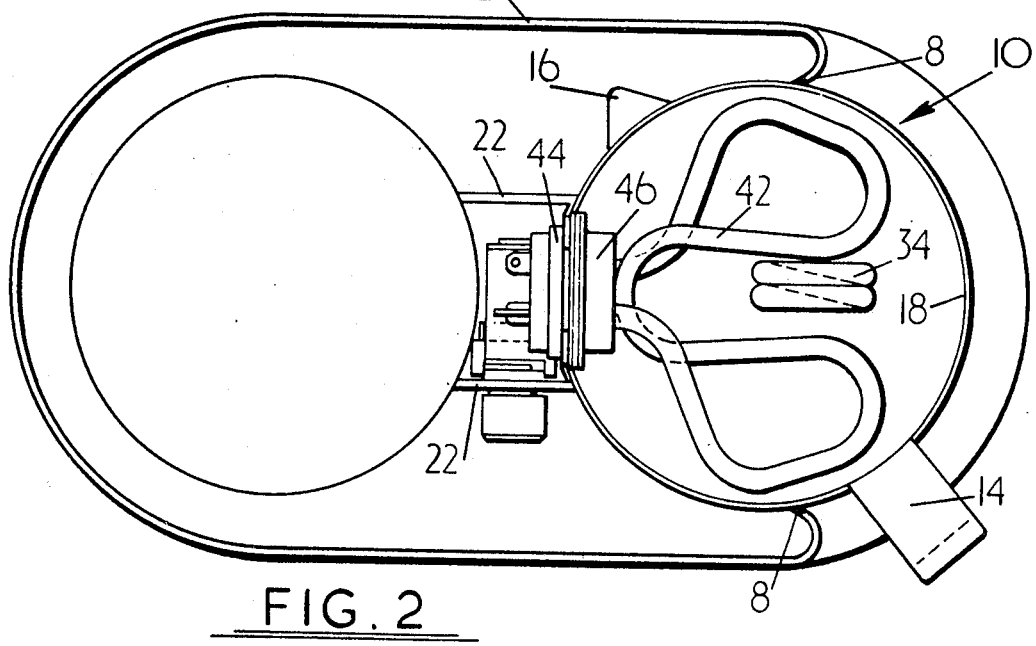

The invention will now be further described by way of example with reference to the accompanying drawings in which:

FIG. 1 is a front view partially fragmented of a beverage-making apparatus formed according to the invention with an optional tray part shown in phantom lines, FIG. 2 is a fragmentary sectional view on the line II—II in FIG. 1, FIG. 3 is a fragmentary sectional view on line III—III in FIG. 1 with a base member of the apparatus absent, FIG. 4 is a circuit diagram of an electrical control of the apparatus in FIG. 1, FIG. 5 is a fragmentary front view of the optional tray for the apparatus showing nested cups at the left hand end of the tray in FIG. 5 and containers fitted together at the right-hand end, FIG. 6 is a perspective view of a catch member for mounting on the apparatus in FIG. 1 for engaging the left hand end of the tray in FIG. 5, FIG. 7 is a perspective view of a fragment of the tray showing the catch engaging end thereof, FIG. 8 is a plan view of the end of the tray in FIG. 7 engaged by the catch in FIG. 6, and FIG. 9 is a section on line IX — IX in FIG. 5.

Referring first to FIGS. 1 to 3, a tea-making apparatus of the bedside type is formed with a horizontal base member 2, which can be of plastics, formed with feet 4. A substantially circular recess 6 formed in the upper side of the member 2 is only partially surrounded by side walls 8 cut away to leave an access opening 10 whereby a tea-pot 12, which can be of metal and of a substantially cylindrical shape, can be readily located in and removed from the recess.

The tea-pot has a handle 14 and a pouring spout 16. When the tea-pot is in the recess 6, the pot is located below a kettle 18, which can be of metal and of a substantially cylindrical shape, affixedly mounted by at least one bolt on a hollow upright pillar 22, which can be plastics, extending upwardly from the base and affixedly mounted thereon alongside the recess 6.

The kettle 18 is provided with a removable lid 24 which when mounted thereon, hermetically seals the interior of the kettle from the surrounding atmosphere. A syphon tube 26 inside the kettle has an open end 30 adjacent a base 32 of the kettle. From the end 30 the tube ascends to a curved tube portion 34 which comprises more than one coil of tube having an uppermost part above the normal water level in the kettle. This plurality of coils of tube acts to prevent pre-syphoning. In the drawing the curved portion 34 is formed by a double coil of tube. From the curved portion 34, the tube descends in a fluid-tight manner through the base 32 to a lower open end 36 located directly above an opening 38 in a lid 40 of the tea-pot. An electric heating element 42 in the kettle is supplied with electric current through a thermal cut-out switch unit 44 of any suitable type known per se clamped to the kettle wall and connected to an electric control circuit to be described herebelow. The switch unit 44 has a metal heat sink 46 for transmitting heat from boiling water in the kettle to actuate the cut-out switch which will also be subsequently described.

A substantially cylindrical casing 48, which can be of plastics, engages in a recess in the base 2 and is attached to the pillar 22 by the bolt 20. The diameter of the casing 48 is substantially equal to that of the kettle and tea-pot so that the apparatus has a symmetrical appearance about the pillar 22. The casing 48 supports an electric lamp 50 and a translucent pane or shade 52 in front of the lamp. The casing also supports a clear window 54 in front of a clock dial 56 provided with the usual hour and minute hands driven by an electric clock unit 58 known per se mounted in the casing. The clock unit is arranged in known manner to make contact between terminals 60 and 62 of a microswitch 64 (FIG. 4) at any desired time in response to the position of a rotatable setting pointer 66 movable manually by a control knob 68. A neon lamp 70 is mounted in the casing 48 to illuminate the dial 56.

A micro-switch 72 in the control circuit is mounted in the base 2 and projects into the recess 6 so that the switch is made by the tea-pot 12 coming into contact therewith when positioned correctly in the recess below the kettle. The control circuit also includes a warning buzzer 74 mounted in the pillar 22 and a manual three-position switch 76 mounted on the pillar. In one position of the switch 76, the control circuit is interrupted to prevent current supply to the element 42, in a second position the element is energized immediately (provided switch 72 is made), and in a third position the element is energized automatically (provided switch 72 is made) upon the clock reaching a predetermined time. The pillar also mounts a manual two-position switch 78 for switching the lamp 50 on and off.

Operation of the apparatus will now be described with reference to FIGS. 1 to 4. Terminals 80 and 82 and an earth terminal E are connected to a convenient electrical supply which then drives the clock 58 and lights lamp 70. The tea-pot 12 is filled with water up to a predetermined level marked on the pot and the water is then transferred to the kettle 18 and the lid 24 fitted thereon. Loose tea leaves or tea bags are introduced into the tea-pot which is then placed in the recess 6 to make the contact between terminals 84 and 86 of the micro-switch 72. The wattage rating of the heating element 42 is known and therefore the duration of time $t$ is known for the heating element to raise the water in the kettle to boiling point from the commencement of energisation of the heating element. Therefore, it it is desired to make tea automatically at a predetermined time T on the clock, the setting pointer is set to a time $T - t$, and the switch 76 is set to make contact between terminals 88 and 90. In its normal position a thermal switch 92, for example a bi-metallic switch in the cut-out unit 44 makes contact between terminals 94 and 96. Therefore, when the clock reaches time $T - t$ and actuates the micro-switch 64 to make contact between terminals 60 and 62, the heating element 42 is energised mainly via line 98 and switch 92 because of the high resistance of the buzzer 74 which thus receives so little current it cannot operate. When the water in the kettle boils, the heat conducted to the thermal switch 92 via the heat sink 46 causes the switch 92 to open. Now the current path to the heating element is exclusively via line 100, the buzzer 74 and line 102. The electrical energy supply to the buzzer is now adequate and audible warning is given that the water has boiled, but the electrical energy supplied to the heating element is greatly reduced. The boiling water automatically syphons into the tea-pot.

It will be understood that irrespective of the clock tea can be made at any desired time by operating the switch 76 to make contact between terminals 88 and 104.

If desired, the clock can be modified so that when the setting pointer is set forth for a time T that tea is desired, the micro-switch 64 is automatically actuated at time $T - t$ on the clock.

If desired a lamp can also be arranged to automatically switch on when the buzzer operates or this lamp in combination with a high resistance can replace the buzzer to give the warning. The warning lamp can be a flashing lamp.

The apparatus can be used to make beverages other than tea. For example, a perforated basket or receptacle for containing coffee bags or a filter paper and ground coffee or coffee powder can be located directly below the opening 38 in the lid of the pot 12.

Referring particularly to FIGS. 5 to 9, the apparatus can be provided with a tray 106 which can be of plastics material. This tray has a substantially circular through opening 108 and a substantially circular recess 110 adjacent respective opposite ends of the tray, the opening 108 and the recess 110 being surrounded by an upstanding annular flange 112 and 114 respectively. Three similar containers 116 each of a sector shape in cross-section as shown in FIG. 9 fit together to form a substantially cylindrical array fitting in the opening 110 with external shoulders 118 of the containers sitting on the rim of the flange 14. Each container can be provided with a dust cap (not shown) and a handle 116'. The containers 116 can be for milk, sugar and loose tea or tea bags or some other beverage flavouring. A stack of cups 120 are nested one in another and are disposed with the lowermost cup located in the recess 108 so that a circumferential shoulder 122 on the lowermost cup 120 is supported by the rim of the flange 112.

The tray 106 is rotatably mounted on the top of the casing 48 and is held thereon by a catch member 124 secured to the casing by screws 126. The catch member 124 has a pair of raised diametrically opposed flanges 128 engaging over diametrically opposed arcuate flanges 130 formed on the tray 106 around the lower end of the opening 108 and spaced at 132. To fit the tray 106 on the apparatus the tray is located so that the flanges 128 are disposed in the spaces 132. Then the tray is rotated through approximately 45° into the full line position in FIG. 8 so that flanges 128 overlie the flanges 130. In this position the tray is located over the kettle 18. To give access to the kettle 18, the tray can be rotated through a further approximately 90° in the direction of arrow A into the position shown at 106' (FIG. 8) where cut-outs 134 in diametrically opposed ends of the flanges 128 contact abutment 136 on diametricaly opposed ends of the flanges 130.

What is claimed is:

1. A beverage-making apparatus comprising a water-heating kettle with removable lid means which when fitted on said kettle results in the interior of the kettle being in substantial fluid-tight isolation from the surrounding atmosphere, said kettle being provided with an electrically powered heating element connected to a control circuit for connection to a supply of electrical current, a syphon tube provided inside the kettle and having an open end disposed adjacent to the base of said kettle, said tube having a first tube portion extending upwardly from said end to a second tube portion comprising more than one coil of tube to prevent or impede pre-syphoning, and a third tube portion extending downwardly from the second tube portion to an open second end of the tube disposed below the base of the kettle for introducing hot water into a tea-pot or other infusion vessel, disposed below the kettle, and a thermally operated device responsive to the temperature of the water in the kettle to interrupt a conductive path supplying electrical energy to said heating element, when the temperature rises above a predetermined value.

2. A beverage-making apparatus as claimed in claim 1 in which the kettle is affixedly mounted on the apparatus.

3. A beverage-making apparatus as claimed in claim 1 in which the tea-pot can be removed from below the kettle without the latter or the syphon tube being moved.

4. A beverage-making apparatus as claimed in claim 1 in which the control circuit includes switch means arranged for actuation for permitting electrical energisation of the heating element, and said switch means being actuable by the tea-pot or other infusion vessel when the latter is placed in position below the kettle.

5. A beverage-making apparatus as claimed in claim 1 in which a tray is mounted over said kettle, and the tray is displaceable to give access to a filler opening of the kettle.

* * * * *